Dec. 11, 1951 P. S. HARDY 2,577,890
AUTOMOBILE TRACTION DEVICE
Filed Oct. 16, 1947
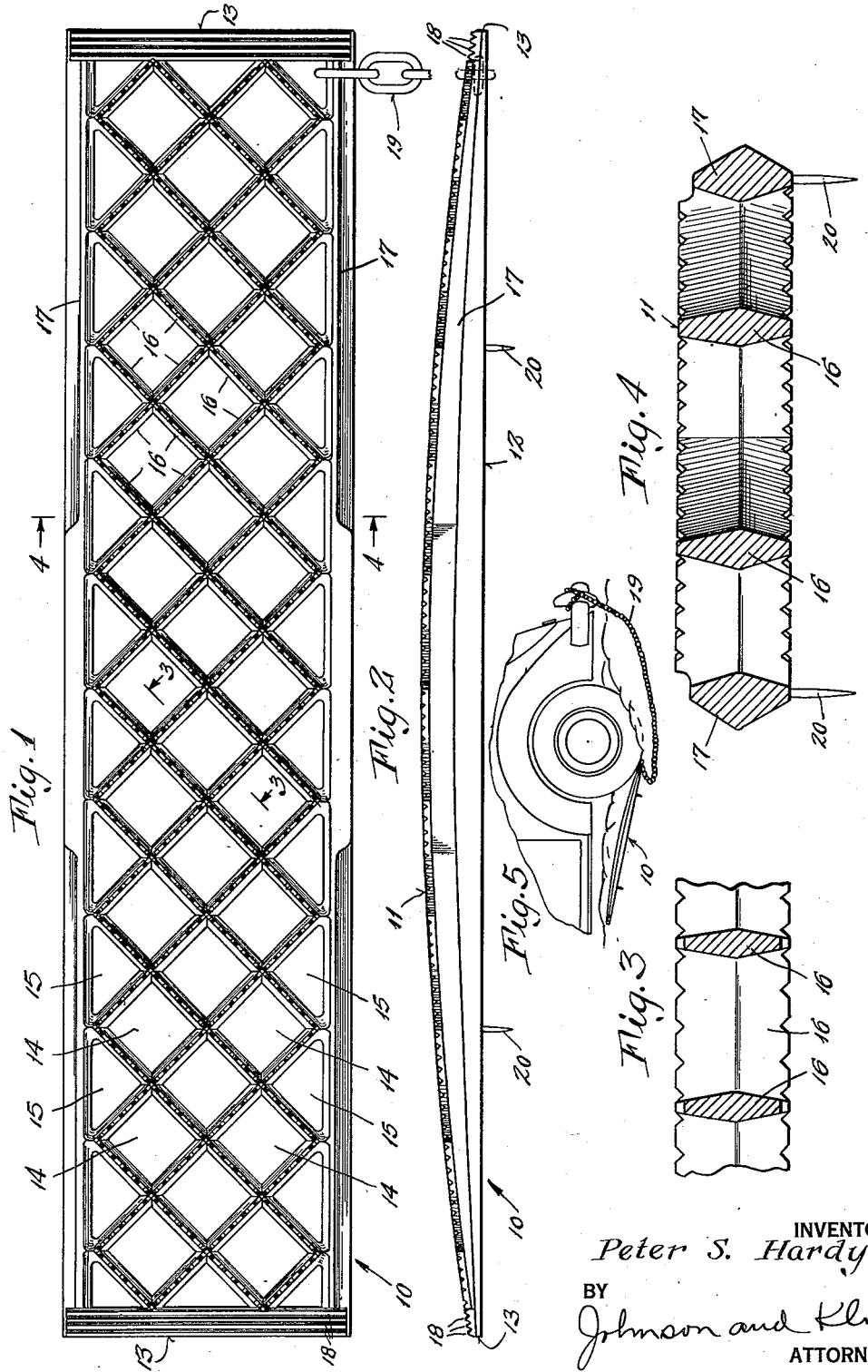
INVENTOR
*Peter S. Hardy*
BY
*Johnson and Kline*
ATTORNEYS Patented Dec. 11, 1951

2,577,890

UNITED STATES PATENT OFFICE 2,577,890

AUTOMOBILE TRACTION DEVICE

Peter S. Hardy, Bridgeport, Conn.

Application October 16, 1947, Serial No. 780,123

5 Claims. (Cl. 238—14)

This invention relates to traction devices for motor vehicle wheels, and more particularly to an improved detached traction device adapted to get the vehicle in motion on slippery or ice covered pavements or roads.

Heretofore it was proposed to provide detached treadlike devices to be placed under the driving wheels of a vehicle so that the wheels would not spin idly on slippery surfaces. Such devices have not been particularly satisfactory in practice for the reasons that they were not sufficiently skid-proof and also were inconvenient to handle and insert between the driving wheels and the road. Moreover, some such devices were flexible so that they could be rolled up for storage, but these were especially difficult to properly place in position, and also tended to coil during use and be carried around with the wheel to positions where they would jam against other parts of the vehicle.

According to the present invention, the improved auxiliary or detached traction device which is preferably made in one piece for each wheel and of rigid or stiff material, has a unique form or shape providing for structural strength and rigidity, and economy of fabrication while at the same time enabling it to not only embed itself in snow and slush and bite into the surface of ice with great effectiveness, but also to present a similarly effective and rough surface to the tire tread so that the vehicle may positively get in motion and proceed as desired.

In accomplishing this, in the preferred form of the invention, the tread is made of a single casting having numerous, juxtaposed openings bounded by anti-skid ribs or ridges in the shape of lattice work having openings therethrough, the margins or ridges of which form biting edges on opposite surfaces of the tread, and the material is preferably aluminum or aluminum alloy for lightness, rigidity and strength. Being stiff, the traction device of the present invention may be readily manipulated to shove one end into the angle between the tire tread and the slippery surface with very little effort and without the effort being largely wasted, as is the case by the crumpling up of prior devices which roll up. Moreover, the device of this invention may be readily positioned without the necessity of getting one's fingers near the wheels as might occur with prior devices should an assistant try to insert the device while the driver applies power to the slipping wheel, since the present device may be grasped by the end remote from that applied to the wheel, and still be easily handled and located, due to its light-weight structure or shape.

Further, by being rigid, the device may be handled with ease, particularly in the dark, by feel rather than sight, and the exasperating task of aligning the tread with the car is thus obviated. The device being substantially flat, may be easily stowed in the trunk or other compartment and may even be left on the floor of the back seat of a sedan until needed without inconvenience or discomfort to passengers in the back seat.

Other features and advantages will hereinafter appear.

In the accompanying drawings:

Figure 1 is a top or plan view of the improved traction device of the invention.

Fig. 2 is a side elevation of the traction device.

Fig. 3 is a fragmentary section taken on line 3—3 of Fig. 1.

Fig. 4 is a transverse section taken on line 4—4 of Fig. 1 and

Fig. 5 is an elevational view showing the rear wheel of an automobile, and showing the traction device positioned for providing a non-slip tread for the wheel.

As shown, the improved traction device of this invention comprises a generally flat, rigid, elongate member 10 which is preferably formed of cast aluminum. Referring to Fig. 2 the upper or wheel-engaging contour 11 of the member 10 is curved so as to present a convex face to the wheel, while the bottom contour 12 of the member is substantially flat. Thus the member 10 has its thickest portion midway between the ends 13, and tapers toward the ends so that the latter are reduced in thickness and quite thin, although not to the extent that the strength of the member is below that required in its use, to support the weight of a car.

The width of the member 10 is preferably such as to accommodate only one wheel of the motor vehicle, two such members being intended for use with each vehicle, one for each driving wheel thereof. By virtue of the ends 13 being of relatively thin section, either end may be easily positioned or inserted in the angle between the tire tread and the supporting surface, as shown in Fig. 5.

According to the present invention, the member 10 is provided with a large number of juxtaposed openings 14 and 15, the openings 14 being generally diamond-shaped and the openings 15 being triangular, and all of said openings being formed by diagonal struts or partitions 16 intersecting each other, that is, extending in criss-cross or lattice fashion. As shown in Figs. 3 and 4, the partitions 16 are somewhat diamond-shaped in section but are large in depth as compared with their width or thickness. The partitions 16 therefore provide, in effect, ribs or ridges which bound the openings 14 and 15. Also, as shown in Figs. 1 and 4, the member 10 has side rails 17 which are likewise generally of diamond-shaped cross section, and which also function to bound the openings 15.

By this construction an extremely effective anti-skid action is obtained, since the top and bottom edges or ridges of the partitions 16 form prominent biting edges on opposite sides of the member 10. Thus, when the member is placed in position to be traversed by the driving wheel of an automobile it will effectively embed itself in snow and slush, and the ridges thereof will bite into the surface of ice, and the member will also present a similarly effective and rough surface to the tire tread. As a result of this, a positive traction is established between the tire and the supporting surface, so that the vehicle may be quickly and easily gotten into motion and driven out.

Preferably, as shown, the ends 13 of the member 10 are provided with a plurality of transverse ribs 18 on their upper surfaces to facilitate the initial engagement of the tire with the member. When the ribs 18 are engaged by the tire tread it tends to pull the member 10 under the wheel, and also provides a traction surface for the tire whereby it will start to traverse the member. Also, the ridges constituting the top and bottom edges of the partitions 16 are preferably notched, as shown, thereby to increase the anti-skid qualities of the device.

As shown in Figs. 1 and 5, a chain 19 may be secured to the member 10 and connected with any convenient part of the car such as the bumper, whereby after the vehicle has traversed the member it may be kept moving until entirely clear of the difficult terrain, whereupon the member 10 may be retrieved without requiring walking back any considerable distance, inasmuch as the member will be dragged behind the vehicle by the chain.

If desired, the member 10 may be provided with hardened steel spikes 20 which are embedded in the member and project from the undersurface thereof, the spikes being preferably incorporated in the member at the time it is cast.

By the provision of the large number of juxtaposed openings 14 and 15, together with the prominent, relatively sharp edges or ridges provided on opposite sides by the member 10, an extremely effective anti-skid action is had, enabling the member to readily embed itself in snow and slush, and bite into the surface of ice and other frozen matter. In addition, the structure is easily cleaned, and is such as to have rigidity and yet be extremely light in weight. Therefore, there is combined by the present invention a device which is not only extremely effective in its anti-skid properties, but is also strong enough to withstand the usage encountered, and light enough to enable it to be readily and conveniently manipulated. Also, the construction is such that the member 10 may be economically cast, thereby holding the fabricating cost to a very low value.

Variations and modifications may be made within the scope of this invention and portions of the improvements may be used without others.

I claim:

1. An auxiliary or emergency traction device comprising a rigid substantially flat, elongate casting having a width to be engaged by one wheel only of a motor vehicle and having, throughout substantially its entire area, traction-facilitating holes extending therethrough from one side to the other, said casting having deep relatively sharp rigid ribs of diamond-shaped cross section, bounding each of the holes, on both its sides and having one end reduced in thickness to facilitate its insertion in the angle between the tire tread and the supporting surface engaged thereby.

2. An auxiliary or emergency traction device comprising a rigid substantially flat, elongate casting having a width to be engaged by one wheel only of a motor behicle and having, throughout substantially its entire area, diamond-shaped traction-facilitating holes extending therethrough from one side to the other, said casting having deep intersecting rigid ribs, bounding each of the holes, on both its sides and having one end reduced in thickness to facilitate its insertion in the angle between the tire tread and the supporting surface engaged thereby.

3. An auxiliary or emergency traction device comprising a rigid, substantially flat elongate casting of light-weight metal having a width to be engaged by one wheel only of a motor vehicle, said casting including parallel side frame bars; and a tread section, extending between said bars and integrally connected to the same, said tread section consisting of an open lattice made up of intersecting webs each having a tire engaging edge and a ground engaging edge, the depth of each web between said edges at any point being substantially equal to the casting thickness at that point and greater than the web thickness measured parallel to the plane of the casting, said casting having a portion of its length substantially equal to twice its width which is continuously tapering in edge view towards and ending at one end of the casting.

4. The traction device as claimed in claim 3 in which each web has its greatest thickness substantially midway between said web edges, said web thickness progressively decreasing towards each edge of the web, whereby said web edges are rendered relatively sharp.

5. The traction device as claimed in claim 3 in which the side frame bars of the casting have downwardly opening recesses; and steel ground-engaging spikes firmly secured in said recesses.

PETER S. HARDY.

REFERENCES CITED

The following references are of record in the file of this patent:

UNITED STATES PATENTS

| Number | Name | Date |
|---|---|---|
| 1,380,574 | Mason | June 7, 1921 |
| 1,401,689 | Gentry | Dec. 27, 1921 |
| 1,410,055 | Brian | Mar. 21, 1922 |
| 1,815,435 | Harding et al. | July 21, 1931 |
| 2,377,648 | Prince | June 5, 1945 |
| 2,428,680 | Piatak | Oct. 7, 1947 |
| 2,443,319 | Mack | June 15, 1948 |